US005535884A

United States Patent [19]
Scott et al.

[11] Patent Number: 5,535,884
[45] Date of Patent: Jul. 16, 1996

[54] DISK CARRYING CASE WITH SLIDING CIRCULAR COVER

[75] Inventors: Ed Scott, Anaheim Hills; Lou Donaty, Fallbrook, both of Calif.

[73] Assignees: Sony Corporation, Tokyo, Japan; Sony Trans Com Inc., Irvine, Calif.; a part interest

[21] Appl. No.: 276,177

[22] Filed: Jul. 15, 1994

[51] Int. Cl.$^6$ ............................................. B65D 85/57
[52] U.S. Cl. ........................ 206/445; 206/308.1; 220/345
[58] Field of Search ........................... 206/445, 303, 206/309, 311, 313, 308.1; 220/351, 350, 252, 345, 346, 349

[56] References Cited

U.S. PATENT DOCUMENTS

| | | | |
|---|---|---|---|
| 1,470,766 | 10/1923 | Schaffer | 220/345 X |
| 1,502,910 | 7/1924 | Pilas | 206/309 |
| 2,344,919 | 3/1944 | Kelly | 206/309 |
| 2,692,698 | 10/1954 | Waterman | 220/350 |
| 2,722,309 | 11/1955 | Waterman | 220/345 X |
| 3,429,629 | 2/1969 | Cilia | 206/309 X |
| 3,651,979 | 3/1972 | Severson | 220/350 X |
| 3,870,148 | 3/1975 | Hite | 206/309 X |
| 4,627,532 | 12/1986 | Clemens | 206/309 |
| 4,753,343 | 6/1988 | Flynn | 206/307 |
| 4,889,229 | 12/1989 | Yamamoto et al. | 220/350 X |
| 5,101,972 | 4/1992 | Hunt et al. | 206/307 |
| 5,147,036 | 9/1992 | Jacobs | 206/313 X |
| 5,186,345 | 2/1993 | Ching An | 220/350 X |
| 5,197,600 | 3/1993 | Garcia | 206/308.3 X |

*Primary Examiner*—Bryon P. Gehman
*Attorney, Agent, or Firm*—Limbach & Limbach

[57] ABSTRACT

A carrying case especially suitable for use in carrying compact disks comprises a pair of circular faces connected to each other in spaced relationship by a circumferential wall having an opening. A cover is positioned over the opening, and is slidable between a closed position in which the opening is covered by the cover and an open position wherein the opening is at least partially exposed for insertion of disks into, or removal of disks from, the carrying case. Each disk to be inserted in the carrying case may be provided with a lint-free, scratch-free sleeve which protects the disk against scratching when it is in the case and also once it has been removed from the case.

13 Claims, 6 Drawing Sheets

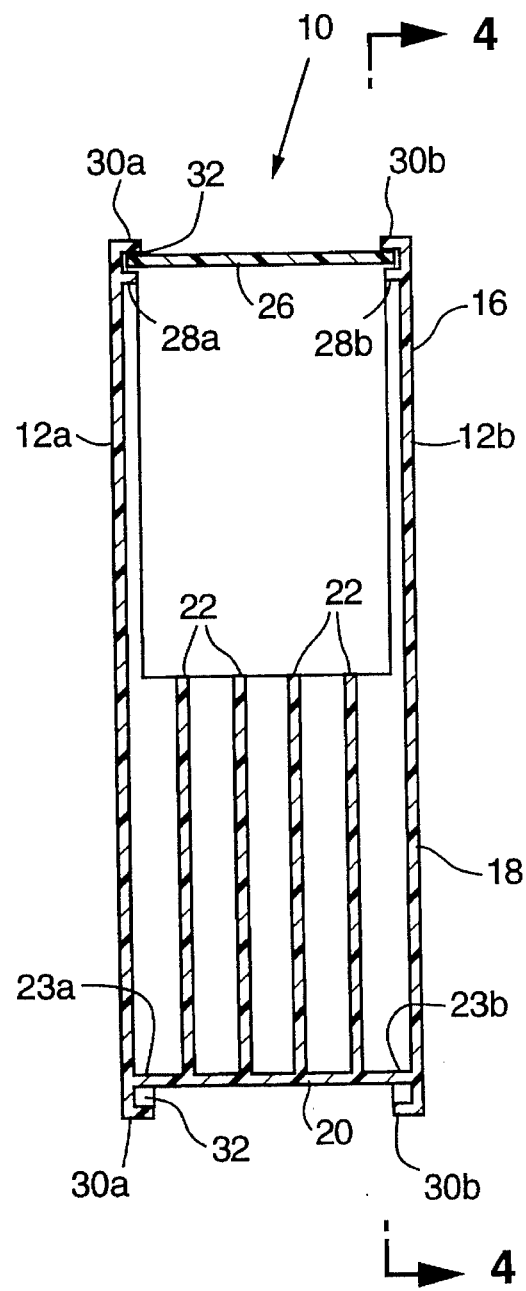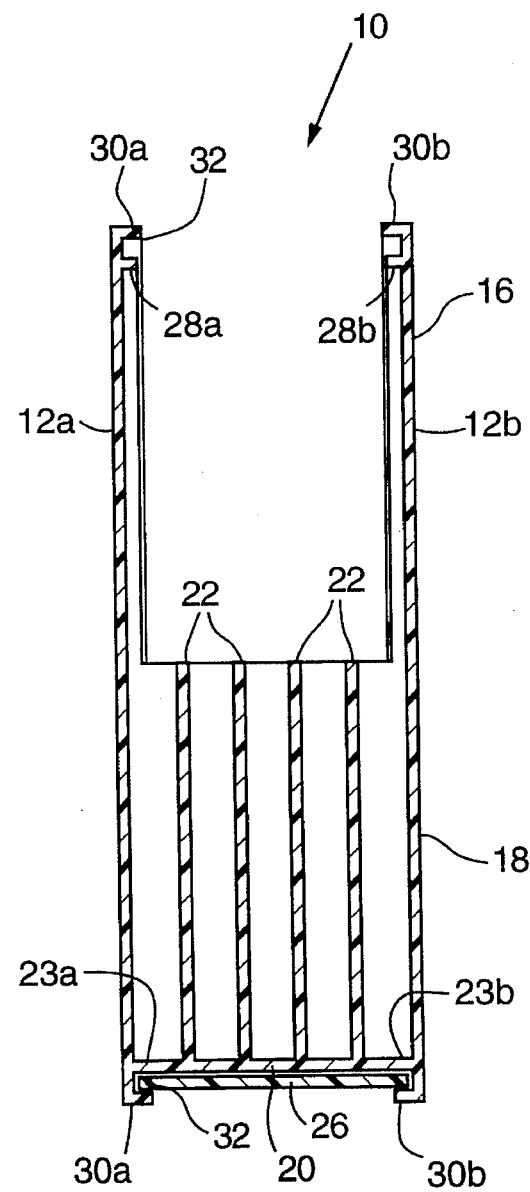
FIG. 3A
FIG. 3B

DISK CARRYING CASE WITH SLIDING CIRCULAR COVER

FIELD OF THE INVENTION

The present invention relates to the field of carrying cases and particularly to cases for transporting and enabling browsing of optical storage disks.

BACKGROUND OF THE INVENTION

Compact disks ("CDs") are a popular medium for storing audio and video data, as well as applications software such as interactive multimedia software or game software. The use of compact disks is being integrated into businesses, schools, and libraries as well as in passenger entertainment systems used in multi-passenger vehicles such as trains and airplanes. CD-capable computers provide video and audio output, a CD player, and a user terminal for user interaction. Compact disks storing audio data, video data, and/or application software are available which provide access to films, informational videos, music, game software and other forms of interactive software.

The present invention provides a carrying case which may be used to contain CD disks for personal use or for use by passengers using entertainment systems on multi-passenger vehicles.

Many current carrying cases for disks are cumbersome and are thus not easily carried. For example, one disk carrying case is comprised of a square hinged storage box or case which opens in book-like fashion and which has a number of plastic pages bound within it, each page for receiving a disk. Other types of carrying cases hold not only the disks but also their protective plastic boxes. When loaded with disks, these cases can be very heavy. Still other types of cases consist of folding flexible plastic sleeves, but do not provide rigid protection for the disks.

It is desirable to have a disk carrying case that may be easily carried and which, if necessary, may be easily distributed to passengers by an attendant of a multi-passenger vehicle. It is also desireable to have a carrying case which allows convenient review of labels on the disks contained within it.

SUMMARY OF THE INVENTION

The present invention is a carrying case especially suitable for use in carrying compact disks. The carrying case is comprised of a pair of disk-shaped faces connected to each other in spaced relationship by a circumferential wall having an annular cross-section and an opening sized for dispensing disks stored within the case. A cover is positioned over the opening, and is slidable between a closed position in which the opening is covered by the cover and an open position wherein the opening is at least partially exposed for insertion of disks into, or removal of disks from, the carrying case.

Each disk to be inserted in the carrying case may be provided with a lint-free sleeve which protects the disk against scratching when it is in the case and also once it has been removed from the case.

BRIEF DESCRIPTION OF THE DRAWINGS

FIGS. 3A and 3B are cross-sectional side views of the carrying case of FIG. 1 showing the slidable cover in the closed and open positions, respectively.

DETAILED DESCRIPTION OF THE PREFERRED EMBODIMENTS

Figure 1:
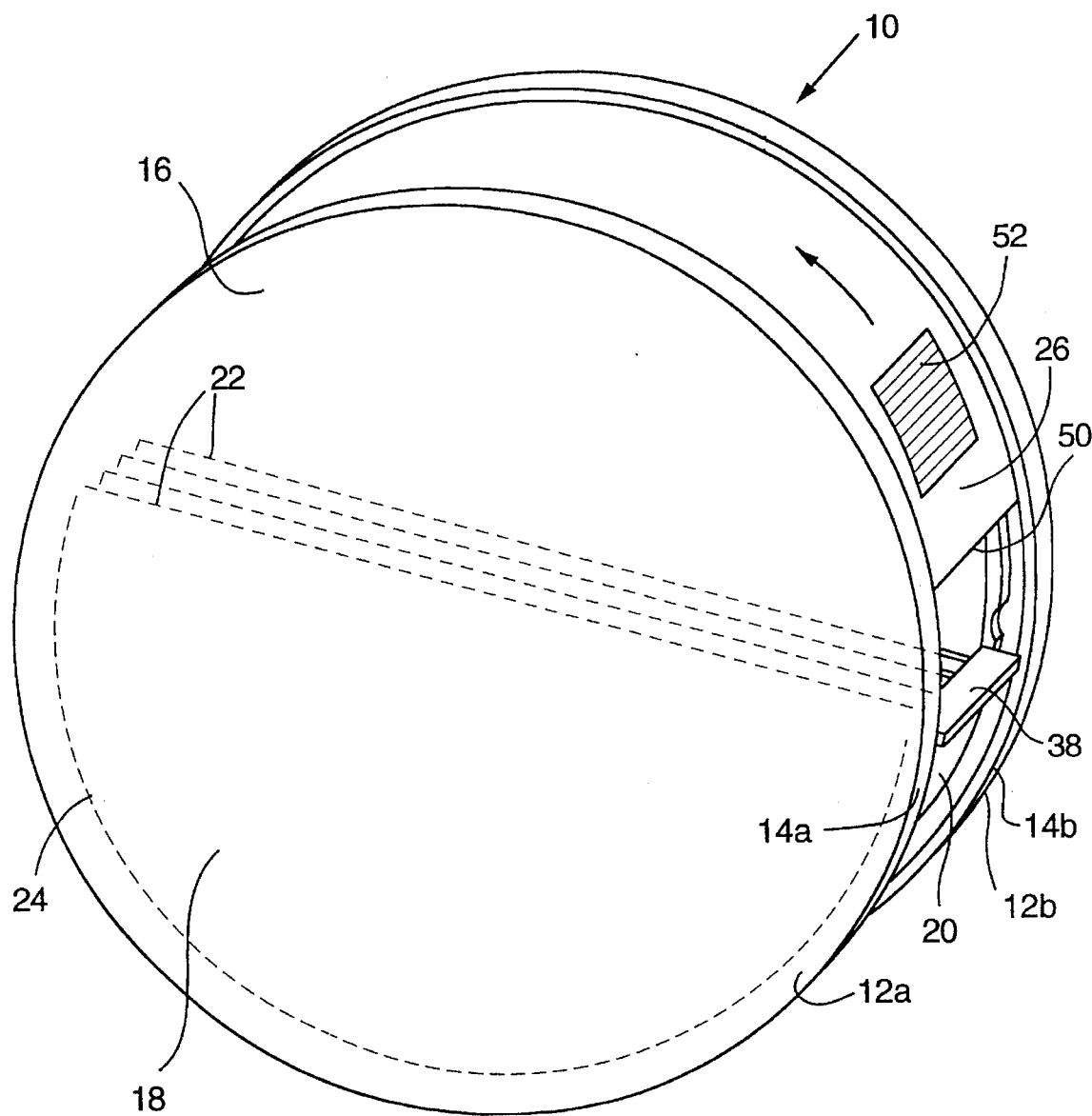
FIG. 1 is a perspective view of a preferred carrying case according to the present invention.

A preferred carrying case 10 according to the present invention is shown in FIG. 1.

The case 10 is comprised of a pair of parallel faces 12a, 12b, each having a circular perimeter, designated 14a, 14b, respectively. Faces 12a and 12b are denoted "circular faces" since they have circular outer peripheries, each face having a preferred diameter of between 4.75 and 6 inches.

The case 10 has an upper half 16 and a lower half 18. A fixed wall 20 is secured to perimeters 14a, 14b at lower half 18 of case 10. Wall 20 fixedly connects the lower half of face 12a to the lower half of face 12b. A number of disk separators 22 having perimeters 24, are positioned in the lower half 18 of the case 10, such that they are parallel with the faces 12a, 12b. The disk separators 22 are secured to the fixed wall 20 at their perimeters 24.

Figure 5A:
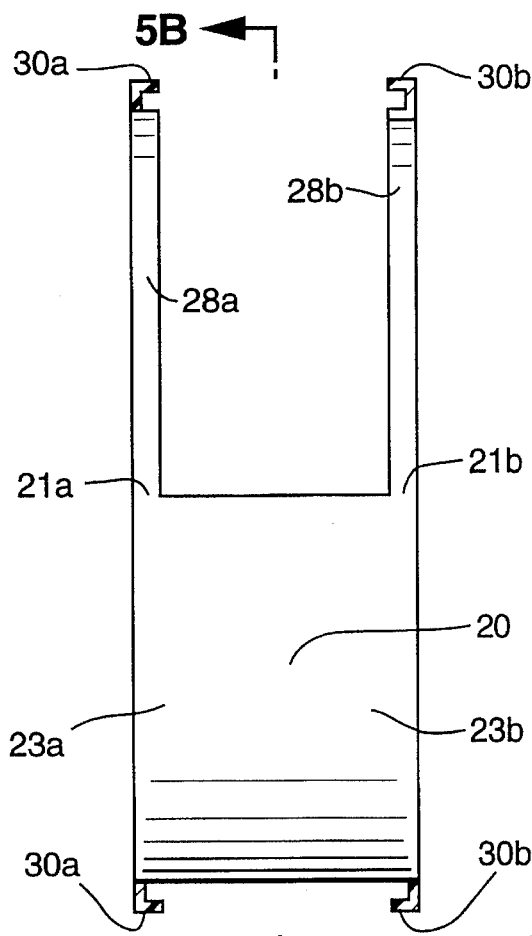
FIG. 5A is a side elevational view of the carrying case of FIG. 1 showing the second rails in section and not showing the sliding cover.
Figure 5B:
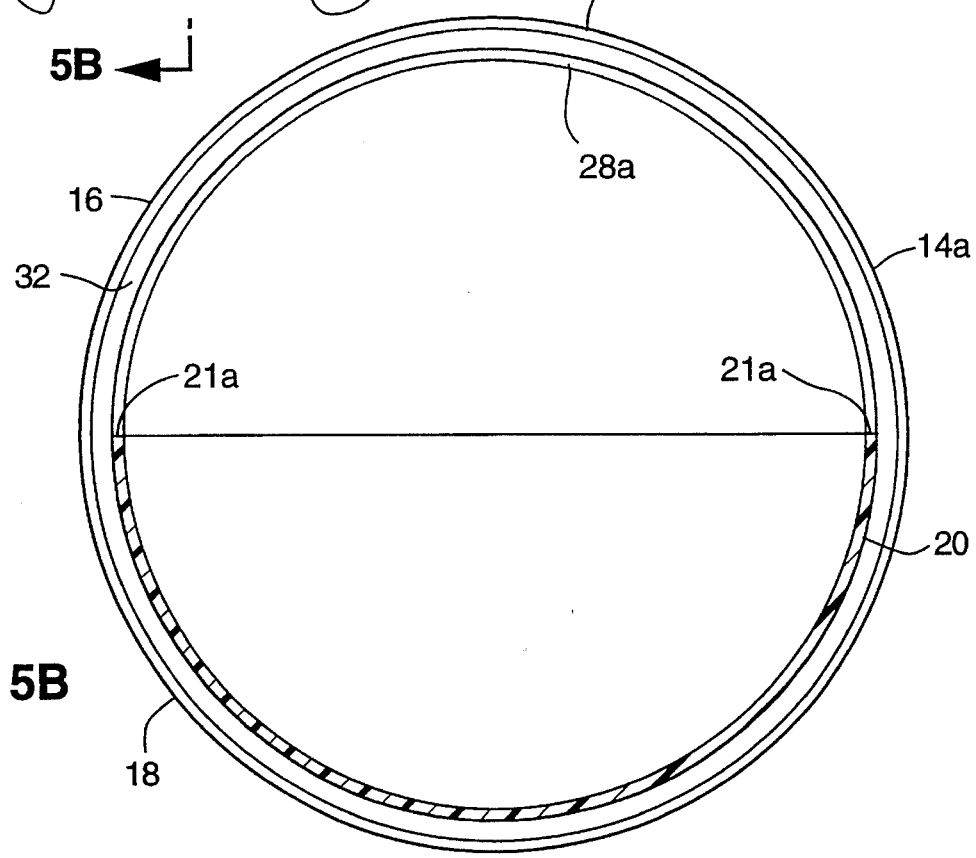
FIG. 5B is a cross-sectional front view of the carrying case of FIG. 1 taken along the plane designated 5B—5B in FIG. 5A.

A sliding cover 26 is slidable along perimeters 14a, 14b to open and close the carrying case 10. The cross-sectional views of FIGS. 3A and 3B illustrate the structure which allows the sliding cover 26 to move relative to wall 20 between opened and closed positions. Referring to FIGS. 3A and 3B, it can be seen that each face 12a, 12b has an inwardly-facing first rail 28a, 28b running parallel to the perimeter 14a, 14b of each face 12a, 12b at the upper half 16 of the case 10. As shown in FIGS. 5A and 5B, the rails 28a, 28b and the wall 20 are annular in cross-section and they have equivalent outer diameters. The rails 28a, 28b are connected to the wall 20 at intersection points 21a, 21b.

Second rails 30a, 30b are formed along the perimeters 14a, 14b of each face 12a, 12b. At upper portion 16 of the case 10, the second rails 30a, 30b are parallel to the rails 28a, 28b. At lower portion 18 of the case 10, the second rails 30a, 30b are parallel to the outer portions 23a, 23b (FIG. 3A) of the wall 20.

A space 32 which extends around the entire perimeter of the case 10, is bounded by the rails 30a, 30b and the rails 28a, 28b at the upper half 16 of the case 10 and by the rails 28a, 28b and the fixed wall 20 at the bottom half 18 of the case 10.

This sliding cover 26 is slidable within this space 32 between the closed position shown in FIG. 3A, wherein the sliding cover 26 extends between the walls 12a, 12b at the upper half 16 of the case, and the closed position, shown in FIG. 3B, wherein the sliding cover 26 extends between the walls 12a, 12b at the lower half 18 of the case, parallel to the fixed wall 20. Thus, when in the open position, an opening 34 is provided for withdrawing disks from, or inserting disks into, the case 10. When inserted into the case 10, disks are preferably inserted between the disk spacers 22 in order to prevent them from becoming scratched.

Inadvertent opening or oversliding of the sliding cover 20 is prevented by a latch 36 and a stop 38, respectively. Latch 36 (shown in FIG. 4) is comprised of a tab 40 which extends inwardly from one end 42 of the sliding cover 26, and recessed catches 44 formed in each of rails 28a, 28b. The catches 44 are positioned for simultaneous mating engagement with the tab 40 when the sliding cover 26 is in a fully closed position.

When the sliding cover 26 is moved to the closed position, tab 40 engages with catches 44 to prevent inadvertent opening of the case 10. Tab 40 can be disengaged from catches 44 upon application of manual force on cover 26 in the direction of the arrow shown in FIG. 1. A grooved finger grip 52 is provided on the exterior surface of sliding cover 26 to facilitate opening by enabling a user more easily to exert force in the direction of the arrow shown in FIG. 1.

When the sliding cover 26 is advanced from the closed to the fully open position, it is desirable to prevent cover 26 from continuing all the way around the perimeter of the case and thereby inadvertently re-closing the case. The stop 38 presents an obstacle to a re-closing of this nature.

Figure 2:
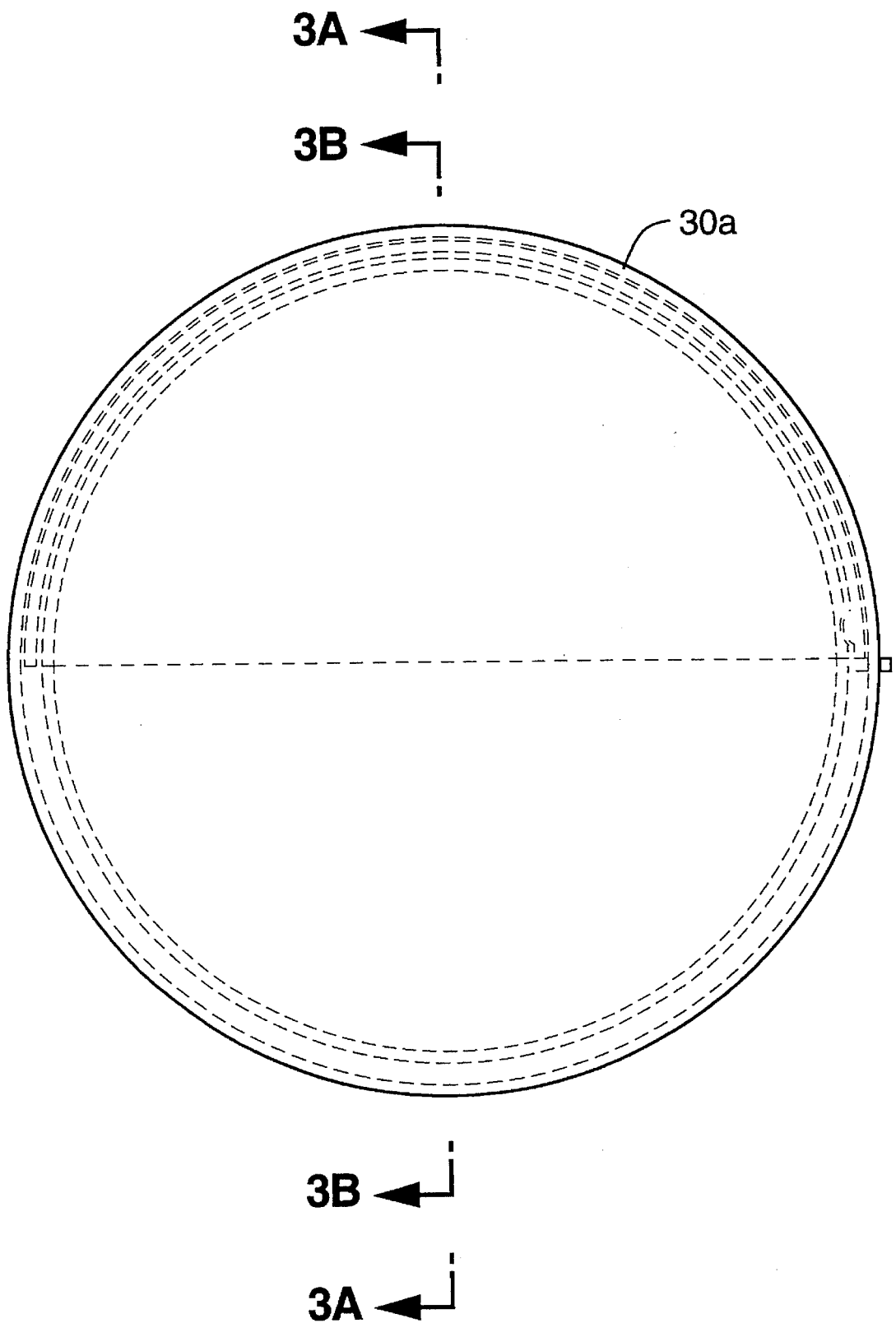
FIG. 2 is a front plan view of the carrying case of FIG. 1.
Figure 4:
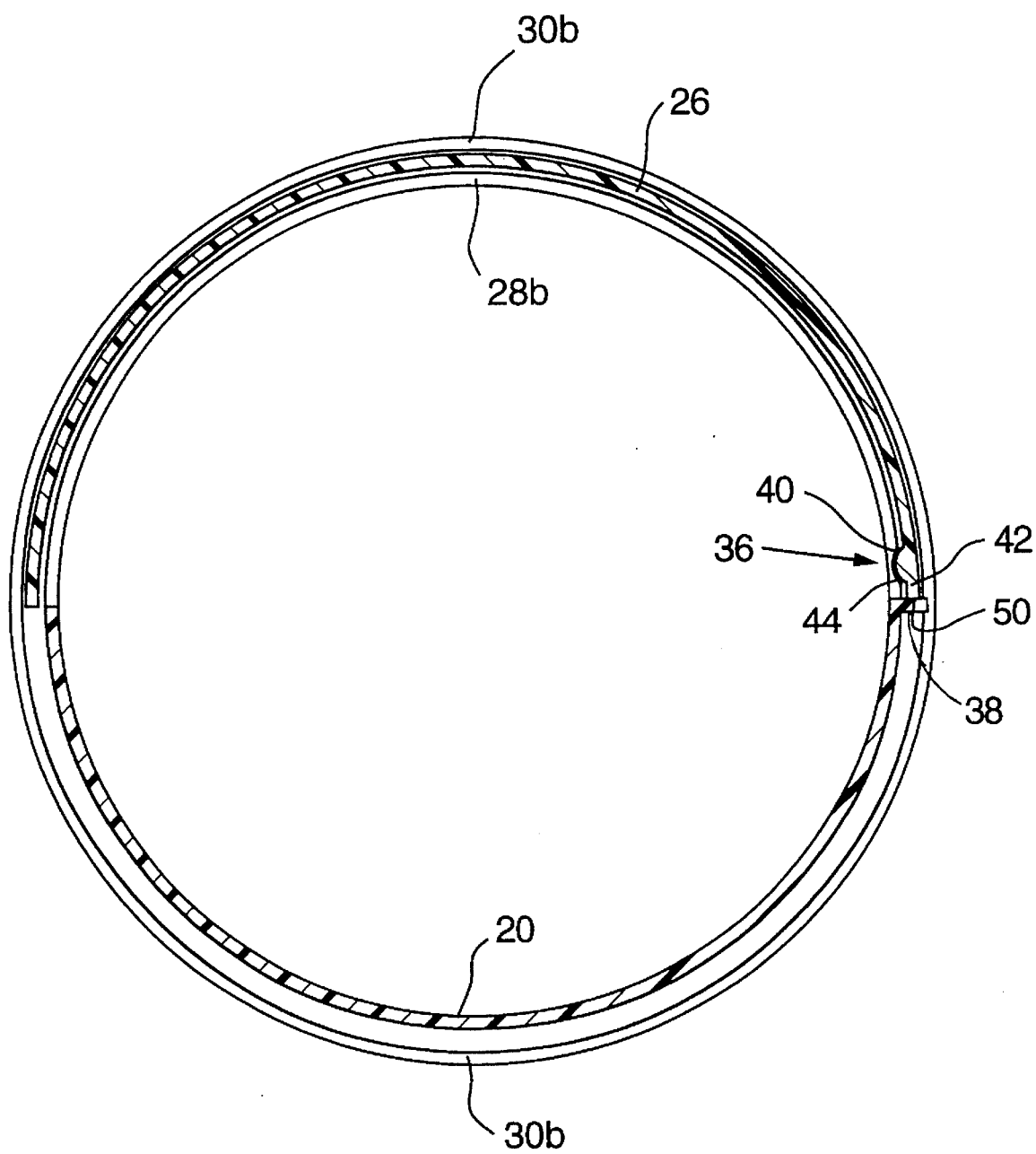
FIG. 4 is a cross-sectional front view of the carrying case taken along the plane designated 4—4 in FIG. 3A.

The stop 38 is a rectangular member which protrudes outwardly from the fixed wall 20 as shown in FIGS. 1 and 4. When the sliding cover 26 reaches the fully opened position, its leading edge 50 abuts the stop 38. The case 10 is re-closed by sliding the cover 26 away from the stop 38 along the same path (i.e. by advancing the cover in the clockwise direction if viewed from the reference point of FIG. 2 or FIG. 4).

The case 10 is preferably constructed of Lexan or molded plastic. In order to accommodate compact disks, the case is preferably between 4.75 and 6 inches in diameter. To minimize the mass of the case, the walls 12a, 12b, the baffles 22, and the sliding cover 26 are preferably approximately 1/16 inch thick. Mass may be further reduced by eliminating the baffles 22.

For a case capable of holding up to five compact disks, the walls 12a, 12b are preferably spaced from each other by approximately 1 inch (measured from the interior surface of each wall). If the case is provided without the baffles 22, up to five disks will be accommodated if the walls 12a, 12b are spaced by approximately 0.75 inch.

The compact and lightweight case of the present invention is suitable for use on airplanes or other multi-passenger vehicles of the type having passenger entertainment systems equipped for CD use. Cylindrical storage bins proportioned for holding several cases of the type described may be provided in the passenger compartments of such vehicles. Such bins may also be incorporated into aisle carts of the type used by airline attendants so as to enable easy distribution of the disk cases to airplane passengers.

Figure 6:
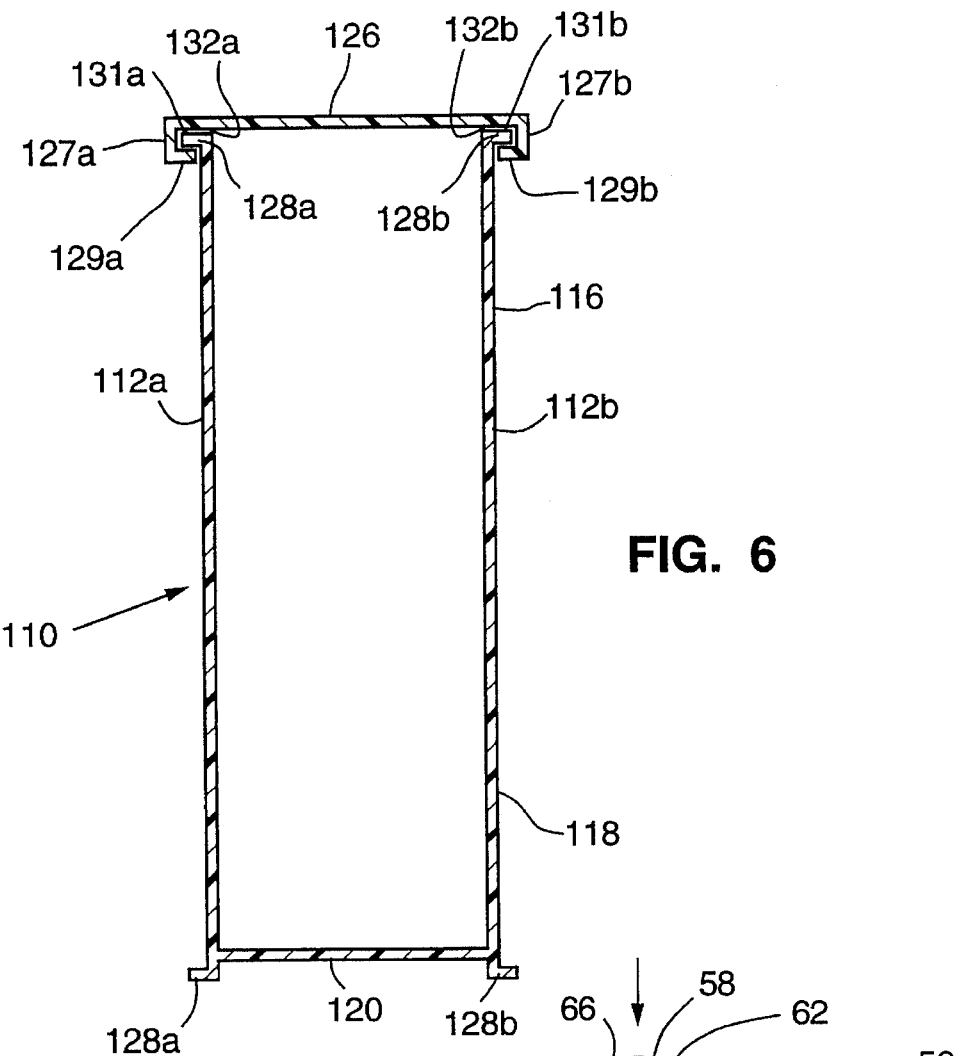
FIG. 6 is a cross-sectional side view of an alternative embodiment of a carrying case according to the present invention.

A case having an alternative configuration for the sliding cover is shown in FIG. 6. In this embodiment each circular face 112a, 112b has an outwardly extending rim 128a, 128b along its entire outer perimeter. As with the preferred embodiment, a fixed wall 120 (corresponding to wall 20 of FIG. 1) connects the faces 112a, 112b at the lower half 118 of the case 110.

A sliding cover 126 (corresponding to cover 26 of FIG. 1) has a pair of parallel walls 127b which are substantially parallel to the faces 112a, 112b. Each wall 127a, 127b is provided with a lip 129a, 129b extending towards its respective face 112a, 112b, parallel to the rims 128a, 128b. A pair of grooves 132a, 132b is thus formed between the sliding cover 126 and the lips 129a, 129b. As can be seen in FIG. 6, the rims 128a, 128b on the faces 112a, 112b are positioned within the grooves 132a, 132b. Thus, the sliding cover 126 can slide along the rails 132a, 132b to open and close the case 110.

A stop (not shown) like the stop 38 in the preferred embodiment (see FIG. 4) may be formed in the wall 120 to prevent overtravel of the sliding cover 126 during opening and closing. Moreover, the alternative embodiment may be provided with a latch (not shown) for holding the sliding cover 126 in the closed position. The rims 128, 128b may thus be provided with recessed catches, similar to the recessed catches 44 formed in the first rails 28a, 28b of the preferred embodiment (see FIG. 4), on their outer surfaces 131a, 131b. Corresponding tabs may be formed in the sliding cover 126 in the same manner as the tabs 40 in the sliding cover 26 of the preferred embodiment.

Figure 7:
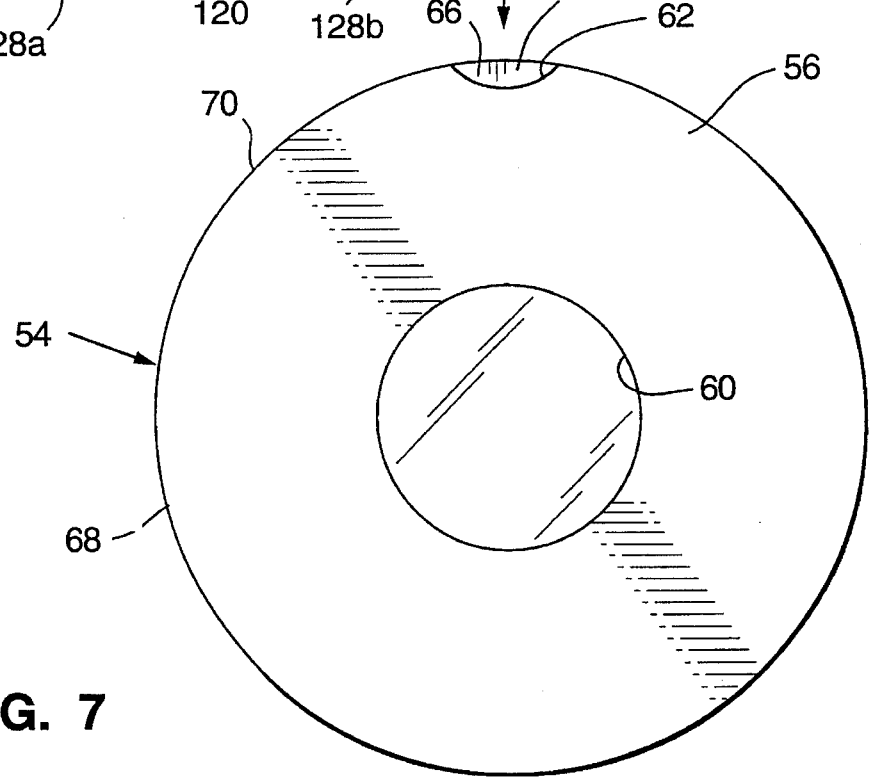
FIG. 7 is a front plan view of a disk sleeve for use with the carrying case according to the present invention.

Each disk to be inserted in the carrying case of the present invention may be provided with a disk sleeve or envelope which helps to protect the disk while it is in the case and also once it has been removed from the case. A disk sleeve 54 for use with the present invention is shown in FIG. 7. It is comprised of two disk-shaped sheets 56, 58 of a lint-free, scratch-free material, preferably Tyvek material. The sheets 56, 58 have a common perimeter 64 and they are connected along approximately half of the perimeter 64 to form a closed portion 68 of the perimeter 64 and an open portion 70 of the perimeter, which allows for insertion of a disk. A window 60 may be formed in one of the sheets so that disk labels can be viewed without removing the disk from the sleeve 54.

Notch 62 formed on one of the sheets 56, at the open portion 70 of the perimeter 64 exposes portion 66 of the side of sheet 58 which faces sheet 56. This facilitates slight separation of the sheets for disk insertion by enabling the user to pull sheet 58 away from sheet 56 to using exposed portion 66 of sheet 58. Insertion of a disk into the sleeve 54 is accomplished by pulling sheet 58 away from sheet to separate the sheets 56, 58, and by inserting a disk (not shown) between the separated sheets 56, 58 in the direction of the arrow shown in FIG. 7.

While two embodiments of the present invention have been described, many others are possible within the scope of the invention.

The scope of the invention is not intended to be limited to the specific embodiments described above, but is limited only in terms of the appended claims.

We claim:

1. A case for carrying disk-shaped objects, comprising:

a pair of faces in spaced relationship, each face having a circular perimeter and a first outer diameter;

an arcuate wall extending between the faces to define a circular chamber between said faces, the wall defining an opening sized for dispensing disks stored within the case and maintaining said faces in said spaced relationship, the wall having an outer diameter that is smaller than the first outer diameter;

a plurality of dividing plates, each dividing plate having an arcuate edge coupled to the wall and a free edge facing the opening and spaced from the opening, the dividing plates arranged in spaced parallel relationship to each other and to the faces;

a pair of inner rails, each inner rail connected to one of the faces along the opening defined by the wall, each inner rail extending partially into the chamber and having an outer diameter that is substantially equal to the outer diameter of the wall;

a pair of outer rails, each outer rail connected to the perimeter of one of the faces and extending partially into the chamber, each outer rail having a first portion substantially parallel to and spaced from one of the inner rails and a second portion substantially parallel to and spaced from the wall;

a cover extending between the faces and slidable between a closed position, wherein the cover is positioned between the first portions of the outer rails and the inner rails, and an open position wherein the cover is positioned between the second portions of the outer rails and the wall.

2. The case of claim 1 further comprising an envelope consisting of two sheets connected along portions of their peripheries to form a pocket between them and an opening leading to the pocket from outside of the envelope, said envelope resting between adjacent dividing plates in the chamber, said envelope being proportioned for receiving a disk in the pocket.

3. The case of claim 2 wherein the sheets are made of a lint-free material.

4. The case of claim 2 wherein the sheets are made of a scratch-free material.

5. The case of claim 1 wherein the cover is slidable in a first direction for movement from the closed to the open position and wherein the cover is slidable in a second direction for movement from the open to the closed position and wherein the case further comprises stop means for preventing the cover from moving from the open to the closed position during travel in the first direction.

6. The case of claim 1 wherein each face has an outer diameter of between 4.75 and 6 inches.

7. The case of claim 1 further comprising latch means for securing the cover in the closed position, the latch means being releasable in response to manual force applied to the cover.

8. The case of claim 7 wherein the inner rails each have an end portion and wherein the latch means comprises:

a recessed catch formed at the end portion of one of the inner rails; and a tab formed on the cover, the tab positioned for mating engagement with the catch when the cover is in the closed position.

9. A case for carrying disk-shaped objects, comprising:

a pair of faces in spaced relationship, each face having a circular perimeter;

an arcuate wall extending between the faces to define a circular chamber between said faces, the wall defining an opening sized for dispensing disks stored within the case and maintaining said faces in said spaced relationship;

a pair of rails, each rail connected to and extending from the perimeter of one of the faces at the exterior of the chamber;

a cover extending between the faces and having a pair of edges each provided with a lip partially disposed around one of the rails, the cover slidable along the rails between a closed position, wherein the cover is positioned over the opening and an open position wherein the cover is positioned to expose the opening; and a plurality of dividing plates, each dividing plate having an arcuate edge coupled to the wall and a free edge facing the opening and spaced from the opening, the dividing plates arranged in spaced parallel relationship to each other and to the faces.

10. The case of claim 9 wherein the cover is slidable in a first direction for movement from the closed to the open position and wherein the cover is slidable in a second direction for movement from the open to the closed position and wherein the case further comprises stop means for preventing the cover from moving from the open to the closed position during travel in the first direction.

11. The case of claim 9 wherein each face has an outer diameter of between 4.75 and 6 inches.

12. The case of claim 9 further comprising latch means for securing the cover in the closed position, the latch means being releasable in response to manual force applied to the cover.

13. The case of claim 12 wherein the latch means comprises:

a recessed catch formed on one of the rails; and a tab formed on the cover, the catch and the tab positioned for mating engagement with each other when the cover is in the closed position.

\* \* \* \* \*